United States Patent
Wang et al.

(10) Patent No.: US 10,547,207 B2
(45) Date of Patent: Jan. 28, 2020

(54) MULTI-COIL SYSTEM AND METHOD WITH TWO-STAGE SELECTION/PING FOR WIRELESS POWER TRANSFER

(71) Applicant: Shenzhen Yichong Wireless Power Technology Co. Ltd., Shenzhen, Guangdong (CN)

(72) Inventors: Zhilin Wang, Chengdu (CN); Tun Li, San Jose, CA (US); Siming Pan, San Jose, CA (US); Dawei He, Burlingame, CA (US)

(73) Assignee: SHENZHEN YICHONG WIRELESS POWER TECHNOLOGY CO. LTD, Shenzhen (CN)

( * ) Notice: Subject to any disclaimer, the term of this patent is extended or adjusted under 35 U.S.C. 154(b) by 170 days.

(21) Appl. No.: 15/788,005

(22) Filed: Oct. 19, 2017

(65) Prior Publication Data

US 2019/0123581 A1  Apr. 25, 2019

(51) Int. Cl.
H02J 50/10 (2016.01)

(52) U.S. Cl.
CPC .................................. H02J 50/10 (2016.02)

(58) Field of Classification Search
CPC ............ H02J 50/10; H02J 50/50; H02J 50/40
See application file for complete search history.

(56) References Cited

U.S. PATENT DOCUMENTS

| | | | | |
|---|---|---|---|---|
| 10,033,229 | B2* | 7/2018 | Kanagawa | H02J 5/005 |
| 2009/0096413 | A1* | 4/2009 | Partovi | H01F 5/003 |
| | | | | 320/108 |
| 2010/0259217 | A1* | 10/2010 | Baarman | H02J 5/005 |
| | | | | 320/108 |
| 2013/0241745 | A1* | 9/2013 | Colvin, Jr. | A61B 5/0022 |
| | | | | 340/870.02 |

* cited by examiner

Primary Examiner — Jared Fureman
Assistant Examiner — Duc M Pham
(74) Attorney, Agent, or Firm — Sheppard Mullin Richter & Hampton LLP

(57) ABSTRACT

A wireless power transfer system is disclosed. The wireless power transfer system may comprise a first group of transmitter coils disposed in a first plane, a second group of transmitter coils disposed in a second plane, and a controller unit configured to: supply a first power to the first group, one or more transmitter coils at a time; compare a first coupling strength of the powered first transmitter coil with a first threshold; in response to determining the first coupling strength exceeding the first threshold, determine the transmitter coil as a selected transmitter coil; supply a second power to the second group, one or more transmitter coils at a time; compare a second coupling strength of the powered second transmitter coil with a second threshold; and in response to determining the second coupling strength exceeding the second threshold, determine the transmitter coil as another selected transmitter coil.

25 Claims, 6 Drawing Sheets

600

601: Cease supplying the first power and the second power in method 500

602: Supply a third power to each of the selected transmitter coils from the first group and a fourth power to each of the selected transmitter coils from the second group 603: Determine a third power for supplying to each of the selected transmitter coils from the first group and a fourth power for supplying to each of the selected transmitter coils from the first group 604: Determine a number of stages 605: Based on the determined number of stages, respectively determine a plurality of stages of the third and fourth power for supplying to each of the selected transmitter coils from the first and second groups, the plurality of stages of the third power incrementing from a first stage up to a final stage equal to the third power, and the plurality of stages of the fourth power incrementing from a first stage up to a final stage equal to the fourth power 606: For a predetermined time, supply the first stage of the third power to each of the selected transmitter coils from the first group and the first stage of the fourth power to each of the selected transmitter coils from the second group 607: In response to not receiving a predetermined response from a wireless power receiver, supply a next stage of the third power and a next stage of the fourth power

FIG. 6

MULTI-COIL SYSTEM AND METHOD WITH TWO-STAGE SELECTION/PING FOR WIRELESS POWER TRANSFER

TECHNICAL FIELD

The disclosure relates generally to wireless power transfer methods and systems, particularly, to multi-coil systems and methods for wireless power transfer.

BACKGROUND

Wireless power transfer (WPT) technology provides the convenience of wirelessly transferring power to electronic devices (e.g., wirelessly charging electronic devices). In a WPT system, power/energy may be transferred from one or more power transmitter coils to one or more power receiver coils through electromagnetic coupling. To improve the overall energy efficiency, it is desirable to minimize energy consumption at the power transmitter.

SUMMARY

One aspect of the present disclosure is directed to a wireless power transfer system. The wireless power transfer system may comprise a first group and a second group of transmitter coils. Each group may comprise one or more transmitter coils. The first group of transmitter coils may be disposed in a first plane, and the second group of transmitter coils may be disposed in a second plane. The wireless power transfer system may further comprise a controller unit. In the selection stage, the controller unit is configured to supply a first power to the first group, one or more transmitter coils at a time; compare a first coupling strength of the powered first transmitter coil with a first threshold; in response to determining the first coupling strength exceeding the first threshold, determine the transmitter coil as a selected transmitter coil; supply a second power to the second group, one or more transmitter coils at a time; compare a second coupling strength of the powered second transmitter coil with a second threshold; and in response to determining the second coupling strength exceeding the second threshold, determine the transmitter coil as another selected transmitter coil. In the ping stage, the controller is further configured to determine a third power for supplying to each of the selected transmitter coils from the first group and a fourth power for supplying to each of the selected transmitter coils from the first group; determine a number of stages; based on the determined number of stages, respectively determine a plurality of stages of the third and fourth power for supplying to each of the selected transmitter coils from the first and second groups, the plurality of stages of the third power incrementing from a first stage up to a final stage equal to the third power, and the plurality of stages of the fourth power incrementing from a first stage up to a final stage equal to the fourth power; for a predetermined time, supply the first stage of the third power to each of the selected transmitter coils from the first group and the first stage of the fourth power to each of the selected transmitter coils from the second group; and in response to not receiving a predetermined response from a wireless power receiver, supply a next stage of the third power and a next stage of the fourth power.

Another aspect of the present disclosure is directed to a wireless power transfer method. The wireless power transfer method may comprise a selection stage and a ping stage. The selection stage may comprise supplying a first power to a first group of transmitter coils, one or more transmitter coils at a time; comparing a first coupling strength of the powered first transmitter coil with a first threshold; in response to determining the first coupling strength exceeding the first threshold, determining the transmitter coil as a selected transmitter coil; supplying a second power to a second group of transmitter coils, one or more transmitter coils at a time; comparing a second coupling strength of the powered second transmitter coil with a second threshold; and in response to determining the second coupling strength exceeding the second threshold, determining the transmitter coil as another selected transmitter coil. Each group may comprise one or more transmitter coils. The first group of transmitter coils may be disposed in a first plane, and the second group of transmitter coils may be disposed in a second plane. The ping stage may comprise determining a third power for supplying to each of the selected transmitter coils from the first group and a fourth power for supplying to each of the selected transmitter coils from the first group; determining a number of stages; based on the determined number of stages, respectively determining a plurality of stages of the third and fourth power for supplying to each of the selected transmitter coils from the first and second groups, the plurality of stages of the third power incrementing from a first stage up to a final stage equal to the third power, and the plurality of stages of the fourth power incrementing from a first stage up to a final stage equal to the fourth power; for a predetermined time, supplying the first stage of the third power to each of the selected transmitter coils from the first group and the first stage of the fourth power to each of the selected transmitter coils from the second group; and in response to not receiving a predetermined response from a wireless power receiver, supplying a next stage of the third power and a next stage of the fourth power.

Another aspect of the present disclosure is directed to a wireless power transmitter. The wireless power transmitter may comprise a first group and a second group of transmitter coils, each group comprising one or more transmitter coils. The wireless power transmitter may further comprise a wireless charging surface configured to provide wireless power transfer to one or more wireless power receivers disposed on one side of the surface. The first and second groups of transmitter coils may be disposed on the other side of the surface, and the first group of transmitter coils may be closer to the wireless charging surface than the second group of transmitter coils. The wireless power transmitter may further comprise a controller unit. In the selection stage, the controller unit is configured to: supply a first power to the first group, one or more transmitter coils at a time; compare a first coupling strength of the powered first transmitter coil with a first threshold; in response to determining the first coupling strength exceeding the first threshold, determine the transmitter coil as a selected transmitter coil; supply a second power to the second group, one or more transmitter coils at a time; compare a second coupling strength of the powered second transmitter coil with a second threshold; and in response to determining the second coupling strength exceeding the second threshold, determine the transmitter coil as another selected transmitter coil. In the ping stage, the controller unit is further configured to: determine a third power for supplying to each of the selected transmitter coils from the first group and a fourth power for supplying to each of the selected transmitter coils from the first group; determine a number of stages; based on the determined number of stages, respectively determine a plurality of stages of the third and fourth power for supplying to each of the selected transmitter coils from the first and second groups, the plurality of stages of the third power incrementing from a first stage up to a final stage equal to the third power, and the plurality of stages of the fourth power incrementing from a first stage up to a final stage equal to the fourth power; for a predetermined time, supply the first stage of the third power to each of the selected transmitter coils from the first group and the first stage of the fourth power to each of the selected transmitter coils from the second group; and in response to not receiving a predetermined response from a wireless power receiver, supply a next stage of the third power and a next stage of the fourth power.

It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which:

FIG. 6 is a flow diagram illustrating another example method for wireless power transfer, consistent with exemplary embodiments of the present disclosure.

DETAILED DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention.

In current technologies, a WPT system may use single-stage selection and ping periodically to decide if starting to transfer power. In order to enter the power transfer state when the electromagnetic coupling is weak, for example, due to large distances between coils or weak-coupling locations of the coils, the WPT will have to supply very large select and ping power, which lowers the system's energy efficiency. The disclosed systems and methods can at least mitigate such problems. In various embodiments, a two stage selection and ping approach is described, which can reduce the energy consumption and increase the system efficiency.

Figure 1:
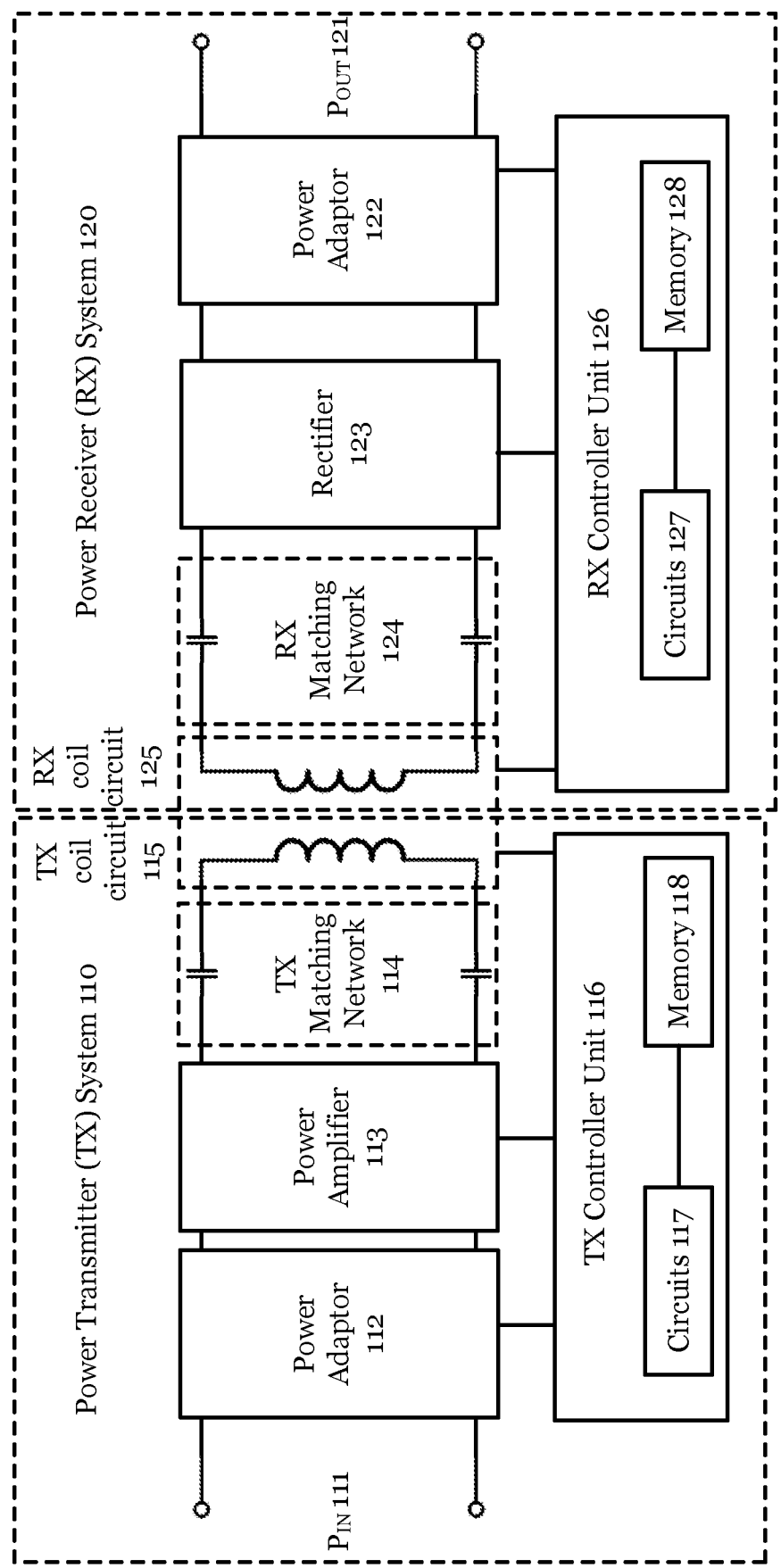
FIG. 1 is a block diagram illustrating an example power transmitter-receiver system, consistent with exemplary embodiments of the present disclosure.

FIG. 1 shows an example power transmitter-receiver system, consistent with exemplary embodiments of the present disclosure. As shown in FIG. 1, the power transmitter-receiver system comprises a power transmitter (TX) system 110 and a power receiver (RX) system 120 wirelessly coupled to each other. The power TX system 110 may include a power adaptor 112, a power amplifier 113, a TX matching network 114 (including one or more capacitors), a TX coil circuit 115, and a TX controller unit (e.g., a TX Micro Controller Unit) 116, some of which (e.g., the power amplifier 113) may be optional. One or more components of the power TX system 110 may be directly and/or indirectly coupled to other components of the power transmitter (TX) system 110. For example, the power adaptor 112 may be directly or indirectly coupled to the power amplifier 113 and/or the TX controller unit 116. The power amplifier 113 may be directly or indirectly coupled to the TX matching network 114 and/or the TX controller unit 116. The TX matching network 114 may be directly or indirectly coupled to the TX coil circuit 115. The TX controller unit 116 may be directly or indirectly coupled to the TX coil circuit 115.

In some embodiments, the power TX system 110 may be coupled to and/or may include a power source that provides input power ($P_{IN}$ 111). For example, the power TX system 110 may be coupled to an electrical output of another device and/or may include an internal power source (e.g., battery, solar panel) that provides the input power ($P_{IN}$ 111). The power adaptor 112 may be configured to receive the input power ($P_{IN}$ 111) and deliver the input power (modified or unmodified) to the power amplifier 113. In some embodiments, the power TX system 110 may be implemented in a powering device (e.g., charger device). In some embodiments, the power TX system 110 may be coupled to a powering device (e.g., charger device).

In some embodiments, the power amplifier 113 may be configured to receive an input power (e.g., through the power adaptor 112). A power transmitter circuit (e.g., TX coil circuit 115) may be coupled to the power amplifier 113 (e.g., through the TX matching network 114). The TX coil circuit 115 may include one or more transmitter-side inductors (e.g., one or more TX coils) and/or other components (e.g., switches). Further details of the TX coil circuit 115 are described below with reference to FIG. 2 and FIG. 3.

In some embodiments, the TX coils of the TX coil circuit 115 may be configured to wirelessly couple to one or more RX-side inductors/coils in one or more power RX systems. A power RX system may be implemented on a device that wirelessly receives power from a power transmitter through the coil-to-coil coupling. In some embodiments, the TX coils of the TX system 110 may be configured to wirelessly couple to one or more the RX coils of RX system 120. For example, close to resonance, the TX coils may wirelessly transfer power to the RX coils when they are brought close to each other. The resonating frequency may be, for example, around 0.1 MHz or higher.

As shown in FIG. 1, the power receiver (RX) system 120 may include an RX coil circuit 125 (comprising one or more RX coils), an RX matching network 124 (comprising one or more capacitors), a rectifier 123, and a power adaptor 122. The output of the power adaptor 122 ($P_{OUT}$ 121) may be coupled to a load. The power adaptor 122 may be coupled to the rectifier 123, which may couple to the RX matching network 124. The RX matching network 124 may couple to the RX coil circuit 125. The RX controller unit (e.g., an RX Micro Controller Unit) 126 may couple to the RX coil circuit 125, the rectifier 123, and the power adaptor 122. The power receiver (RX) system 120 may be implemented in a an electronic device, such as a cell phone, headset, watch, tablet device, laptop, electronic brush, car, or any other electronic devices that may wirelessly receive power. The power receiver (RX) system 120 may be implemented in a stand-alone charging device to which an electronic device may be attached to receive power.

In some embodiments, the TX controller unit 116 and the RX controller unit 126 may each comprise one or more circuits and a memory. The TX controller unit 116 may comprise one or more circuits 117 (e.g., processing circuit, sensing circuit, modulation circuit, demodulation circuit, encryption circuit, decryption circuit, etc.) and a memory 118 coupled to one another. The one or more circuits 117 may be integrated into fewer circuits in the TX controller unit 116 or may be disposed outside and coupled to the TX controller unit 116. The TX controller unit 116 may be coupled to the power adaptor 112 and the TX coil circuit 115 (e.g. TX coils) to monitor the corresponding current, voltage, and/or power level. The one or more circuits 117 may be configured to perform one or more methods described herein, or control one or more components of the TX system 110 to perform one or more methods described herein. The memory 118 may be configured to store information, data, instructions, etc. In some embodiments, the memory 118 may be implemented as a non-transitory computer-readable storage medium storing instructions that, when executed by the one or more circuits 117, cause the TX system 110 to perform one or more methods described herein. Further, the RX controller unit 126 may comprise one or more circuits 127 (e.g., processing circuit, sensing circuit, modulation circuit, demodulation circuit, encryption circuit, decryption circuit, etc.) and a memory 128 coupled to one another. The one or more circuits 127 may be integrated into a few circuits in the RX controller unit 126 or may be disposed outside and coupled to the RX controller unit 126. The RX controller unit 126 may be coupled to the power adaptor 122 and the RX coil circuit 125 (e.g., RX coils) to monitor the corresponding current, voltage, and/or power level.

In some embodiments, the TX controller unit 116 and the RX controller unit 126 may communicate with each other directly or indirectly to exchange data or information, such as individual coil power status, an encryption key, a packet, a required power level, etc. The direct communication may be implemented directly between the controller units via, for example, WiFi, Bluetooth, radio, etc. The TX controller unit and the RX controller unit may each comprise a communication circuit and an antenna to effectuate the direct communication. The indirect communication may be implemented via electromagnetic coupling between the TX and RX coils. The TX and RX controller units may be configured to respectively control the TX coils and RX coils to perform the communication. The frequency of the indirect communication may be a few kHz. The indirect communication may be performed in both directions (RX-to-TX and TX-to-RX) at the same time or in one direction at a time. In one example, the indirect communication may be implemented as load modulation by the load modulation circuit and the demodulation circuit of the TX controller unit 116 and the RX controller unit 126. The load modulation circuit of the TX controller unit 116 may modulate the signals comprising certain information. Upon receipt of the signals, the RX controller unit 126 may control its demodulation circuit to demodulate the signals to obtain the comprised information. Similarly, the RX controller unit 126 can communicate information to the TX controller unit.

In some embodiments, the TX controller unit 116 may be configured to set a voltage and a frequency of the power transmitter (TX) system 110. The TX controller unit 116 may set the voltage and the frequency of the power transmitter (TX) system 110 (the operating frequency) based on output power information of the power receiver (RX) system 120. The output power information may be received via the direct or indirect communication.

Figure 2:
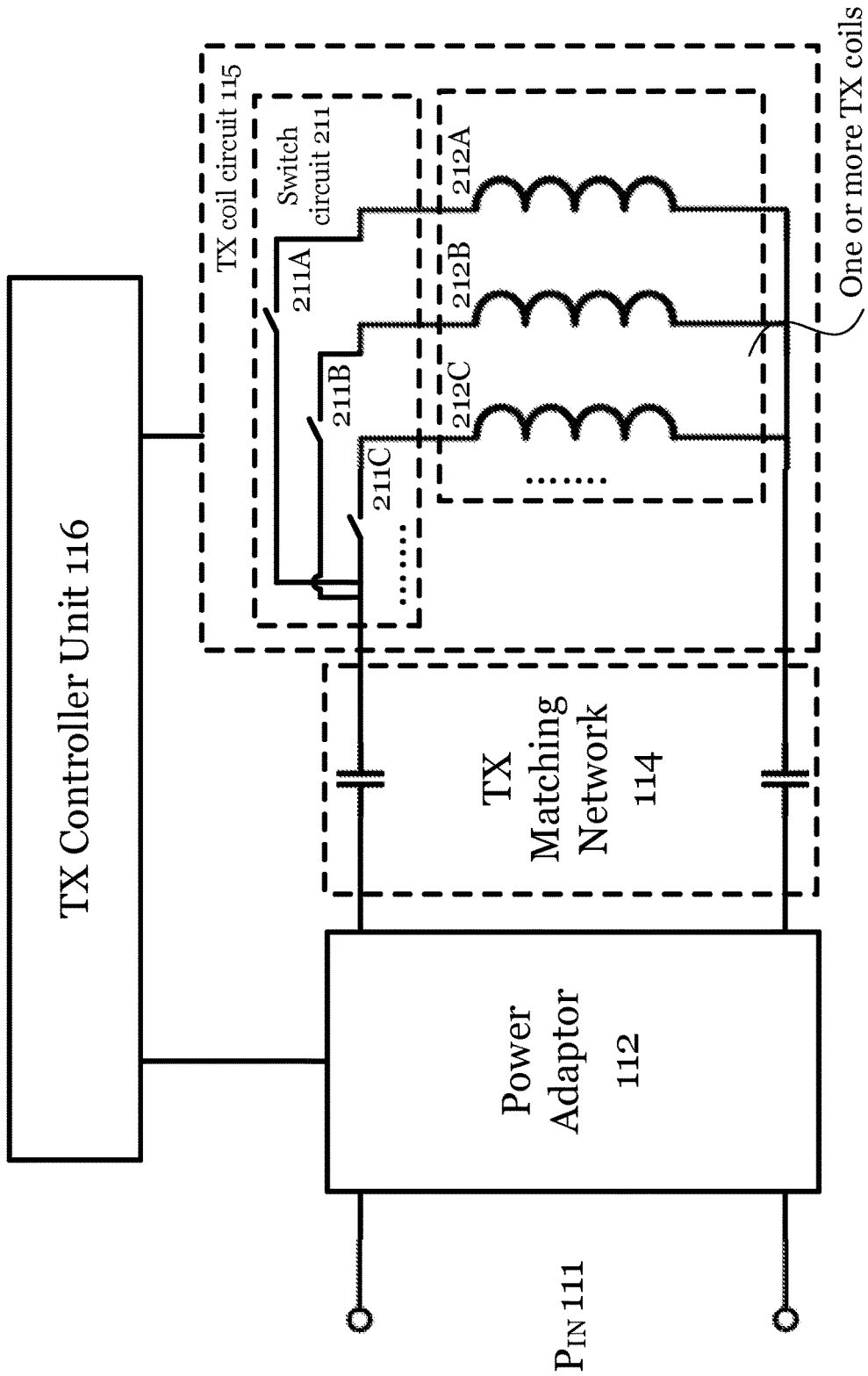
FIG. 2 is a block diagram illustrating an example power transmitter system, consistent with exemplary embodiments of the present disclosure.

FIG. 2 shows an example power transmitter system 110, consistent with exemplary embodiments of the present disclosure. The system 110 may comprise a number of components described above, such as the power input 111, the power adaptor 112, the TX matching network 114, the TX controller unit 116, and the TX coil circuit 115. This figure further illustrates exemplary sub-components of the TX coil circuit 115. In some embodiments, the system 110 may include many more components than those shown in FIG. 2. However, it is not necessary that all of these components be shown in order to disclose an illustrative embodiment.

In some embodiments, the TX coil circuit may comprise a switch circuit 211 and one or more TX coils 212 (e.g., coil groups 212A, 212B, and 212C). Details of the group organization of coils are described below with reference to FIG. 3. The switch circuit 211 may comprises one or more switches (e.g., switches 211A, 211B, and 211C). The TX controller unit 116 may use control signals to control the switch circuit 211, such as opening or closing the one or more switches to enable/disable the one or more TX coils 212. Although FIG. 2 illustrates several layers of coils with each layer coupling to a switch, there can be more ways of coupling the switches to the TX coils. Each switch may be configured to power on/off one or more TX coils in the same group or different groups. Thus, the TX coils of the TX coil circuit 115 may be controlled individually or in groups.

Figure 3:
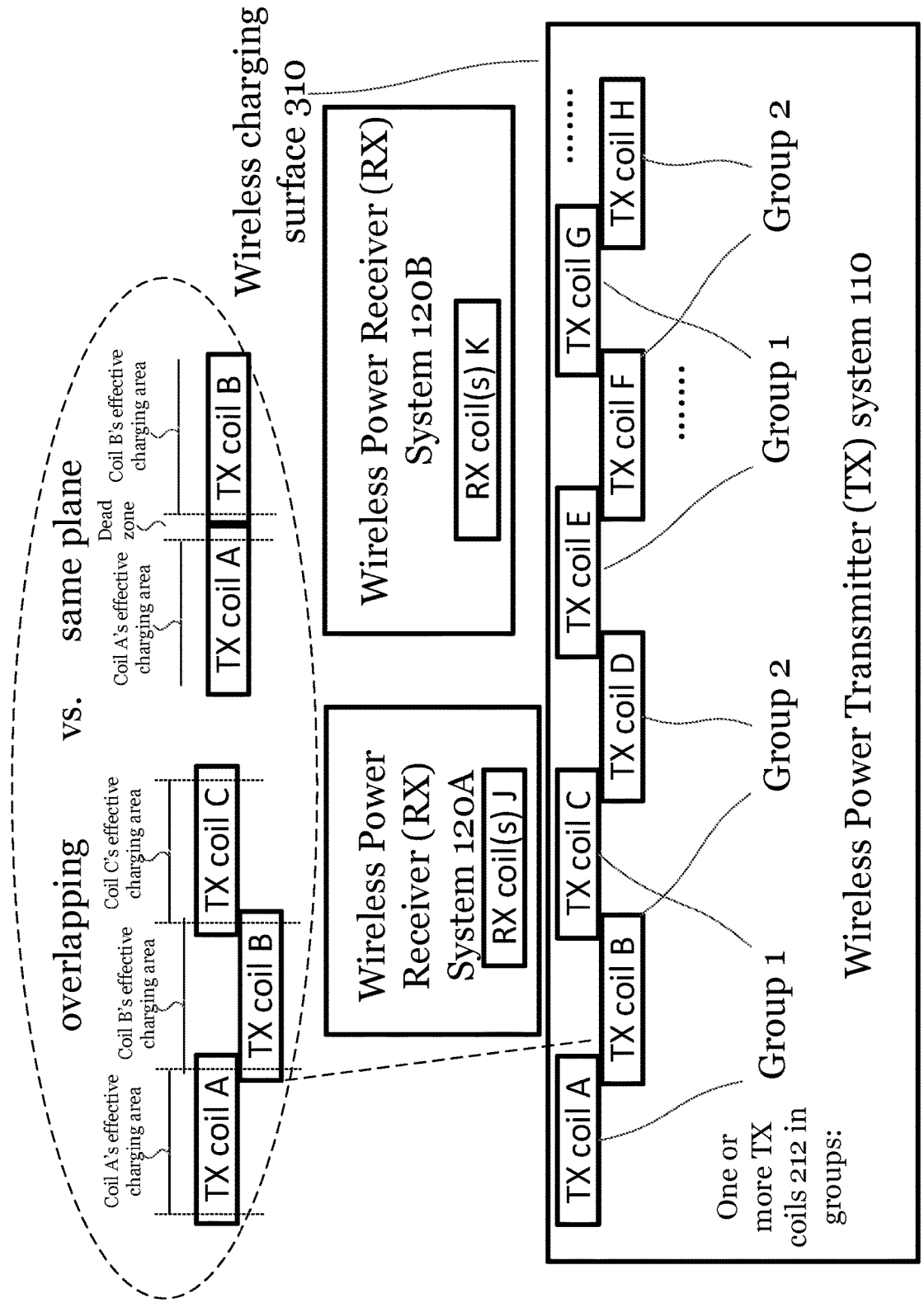
FIG. 3 is a graphical illustration showing an example wireless power transfer between a power transmitter system and two power receiver systems, consistent with exemplary embodiments of the present disclosure.

FIG. 3 shows an example wireless power transfer between a power transmitter system and two power receiver systems, consistent with exemplary embodiments of the present disclosure. The power transmitter system 110 may be implemented in a power transmitter (TX) device (e.g., a charging pad, a charging dock, etc.) configured to wirelessly transfer power to a power receiver (RX) system 120A and a power receiver (RX) system 120B implemented in corresponding power receiver devices (e.g., a mobile device (e.g., a cell phone), a wearable device (e.g., a watch), a tablet device, a computer, a car, or any device that includes a chargeable battery). The wireless power TX device may comprise a wireless charging surface 310, under which the wireless power transmitter system 110 (including TX coils) may be disposed, and on top of which the wireless power RX devices (including RX coils) may be placed to receive power transfer via electromagnetic coupling.

In some embodiments, at the TX side, the wireless power TX system 110 may comprise one or more TX coils 212 disposed in groups. Each group may comprise one or more TX coils. Including a single coil in a TX coil group may enable the controller unit to control the activation of a single coil using a single switch. Including a plurality of coils in a TX coil group may enable the controller to control the activation of multiple coils using a single switch. As shown in FIG. 3, the TX coils 212 may include a coil group 1 and a coil group 2. Coil group 1 may comprise TX coils A, C, E, G, etc. Coil group 2 may comprise TX coils B, D, F, H, etc. All the coils may be identical. Each coil may be flat and in a circular, rectangular, or another shape. FIG. 3 shows the side view of the coils, where the plane of the coils are perpendicular to the plane of the paper.

In some embodiments, the group 1 TX coils may be disposed in a plane substantially parallel to the wireless charging surface 310, the group 2 TX coils may be disposed in another plane substantially parallel to the wireless charging surface 310, and the group 1 coils may be closer to the wireless charging surface 310 than the group 2 coils. As shown in FIG. 3, a group 1 coil may overlap with one or more group 2 coils in a direction perpendicular to the wireless charging surface 310, and vice versa. This overlapping arrangement may be advantageous over disposing all coils in the same plane as illustrated in a dash line bubble of FIG. 3. The effective charging area of a single TX coil refers to a charging area, where if the center of a RX coil is placed inside of the area, a coil-to-coil coupling efficiency should be no less than a desired value (e.g., a value desired or pre-determined by a user). A coil-to-coil efficiency is one of the factors that affect the charging efficiency. The coil-to-coil efficiency is defined as the efficiency between a TX coil and an RX coil, and calculated by the ratio of the output power of the RX coil (e.g., alternating current (AC) power) over the input power of the TX coil (e.g., input AC power). The loss that affects the coil-to-coil efficiency includes the coil-to-coil loss, parasitic resistance loss of TX and RX matching capacitors, etc. By ways of designing a magnetic coil structure, the wireless charging efficiency can be improved, particularly, the coil-to-coil efficiency.

In the overlapping arrangement, one end of TX coil B overlaps with TX coil A, and the other end of the TX coil B overlaps with TX coil C. Since each coil's effective charging area may be smaller than the physical dimensions of the coil, arranging all coils in a single plane would create "dead zones" between coils with insufficient magnetic field strength. Thus, arranging the coils in the overlapping arrangement or in even more layers can eliminate the "dead zones", and the effective charging areas of the coils can connect in the horizontal plane to form a large complete area for electromagnetic coupling and wireless power transfer.

The TX coils 212 may be configured to wirelessly couple to one or more RX coils of one or more power receivers through electromagnetic coupling. For example, in FIG. 3, TX coil C may couple to RX coil(s) J; and TX coils E, F, and G may couple to RX coil(s) K. To maximize the magnetic field strength in the space above the wireless charging surface 310, the TX coils 212 may be disposed substantially parallel to and close to the wireless charging surface 310. Correspondingly, when a wireless power receiver is placed next to the wireless charging surface 310, the RX coils in the wireless power receiver can align substantially in parallel to and closely to the wireless charging surface 310.

To facilitate the alignment of the TX and RX coils, the wireless charging surface 310 may be used as a reference plane. The wireless charging surface 310 may be implemented as a physical surface of a power transmitter device, or as a reference surface (e.g., a non-tangible surface) parallel to the RX and TX coils. Since the wireless coupling effect may cover a few centimeters, the wireless power receiver device can be disposed in direct contact with the charging surface 310 or separated. For example, a power receiver may be placed on a wavy surface 310 or a concaved surface 310, as long as the RX and TX coils can effectively couple to each other (substantially parallel to each other and substantially overlap in the direction vertical to the plane of the coils). In such configuration, the wireless power transfer efficiency can be optimized.

In some embodiments, the interactions between the TX coil(s) and the RX coil(s) may be characterized by coupling strength between the coils. One of the ways of determining the coupling strength is to determine the coupling coefficient. A coupling coefficient may be a dimensionless value defined as the fraction of magnetic flux produced by the current in one coil that links with other coil(s). The coupling coefficient may be used to detect power receivers in the proximity of a power transmitter. For example, the TX controller unit 116 may alternately turn on one or more TX coils 212 to search for any RX coils in the proximity of the TX coils. The input voltage and current to each powered TX coil may be monitored and used to evaluate a coupling coefficient between one or more TX coils and one or more RX coils. If a RX coil is placed in the effective charging area of a TX coil, the coupling coefficient, denoted as k, can be defined as $k=M/\sqrt{L_{tx}L_{rx}}$, where M is a mutual inductance of the TX and RX coils, $L_{tx}$ is the inductance of the TX coil, $L_{rx}$ is the inductance of the RX coil. The value of the coupling coefficient k can reflect the relative position between the TX coil and the RX coil. A closer distance between the TX coil and the RX coil may result in a larger k, while a larger distance between the TX coil and the RX coil may result in a smaller k. The coupling coefficient can be maximized if the TX coil and the RX coil are well-aligned with each other, i.e., centers of the TX coil and the RX coil are aligned. The coupling coefficient k can be estimated by a ratio of the input voltage to the current at the TX side or a rectifier voltage at the RX side. Thus, the coupling strength between an RX coil and a TX coil can be determined based on an input voltage and current to the TX coil or on a voltage to the rectifier 123.

In some embodiments, one or more TX coils may be powered up for a predetermined time period. For example, the controller unit 116 may, in turn, power up TX coil A for 5 ms, TX coil C for 5 ms, TX coils E and G for 6 ms, TX coil B for 6 ms, etc. Since the group 2 coils are further away from the wireless charging surface 310 than the group 1 coils, to achieve at least similar electromagnetic coupling effects at the same distance above the wireless charging surface 310, the group 2 coils may each receive a higher power than the group 1 coils, provided that the group 1 coils and the group 2 coils are identical. This stage of sequential powering may be referred to as a select stage to search for receiver devices in the proximity of the transmitter coil while consuming as little power as possible. Selected coils may be activated for wireless power transfer, while the unselected coils may remain inactivated. When a TX coil is powered up, the TX controller unit 116 may monitor and compare the coupling strength (e.g., determined based on a corresponding coupling coefficient, an input voltage and current to the TX coil, a voltage to a RX rectifier, etc.) between the powered-up TX coil and an RX coil with a predetermined threshold. Any TX coil of which the coupling strength exceeds the predetermine threshold may be determined by the TX controller unit 116 as a selected TX coil. In some embodiments, when the wireless power RX system 120A is placed on the wireless charging surface 310 and when TX coil C is powered up, the coupling strength between the TX coil C and the RX coil may exceed its threshold and be determined as a selected coil. As shown in FIG. 3, the RX coil(s) J of the RX system 120A significantly overlaps with the TX coil C in the direction perpendicular to the wireless charging surface 310, contributing to an efficient coupling between coils J and C.

One or more TX coils can be powered up at the same time. In some embodiments, a wireless power RX system 120B may be placed on the wireless charging surface 310, partially overlapping with TX coil E and TX coil G in group 1, and significantly overlapping with TX coil F in group 2. If the group 1 coils including TX coil E and TX coil G are powered up one at a time, the individual coupling strength may be insufficient to meet the predetermine threshold, causing neither TX coil E, nor TX coil G being selected. If the TX coil E and the TX coil G are powered up at the same time, the combined coupling strength may exceed the predetermine threshold, causing TX coil E and TX coil G to be both selected. Alternatively, if TX coil F is powered up and its coupling strength exceeds the predetermine threshold, TX coil F may be selected.

With reference to FIG. 3, the TX coils may be powered up according to the corresponding groups. For example, controller unit 116 may, in turn, power up TX coil A for 5 ms, TX coil C for 5 ms, TX coils E and G together for 6 ms, TX coil B for 6 ms, TX coil D for 6 ms, TX coil F for 5 ms, TX coil H for 6 ms, and repeat the above cycle from TX coil A. The repetition may stop when a predetermined number of coils are selected or at a predetermined number of cycles are reached. The predetermined number of coils may imply a predetermined number of receiver devices in proximity (e.g., selected TX coil C may correspond to one receiver device, selected TX coils E and G may correspond to another receiver device). If the wireless power TX system is configured to transfer power to up to two receiver devices, the selection cycle may stop after TX coils C, E, and G are selected. Alternatively, if the predetermined number of coils is one, the selection cycle may stop after TX coil C is selected. For another example, if the predetermined number of cycles is one, TX coils C, E, G, and F may be selected, and some or all of them may be used in the following steps to wirelessly transfer power. There may be many other configurations for powering up the TX coils at the selection stage. Coils of different groups may be powered up at the same time. For example, TX coils A, B, C, and D may be powered up for 5 ms, and then TX coils E, F, G, and H may be powered up for 5 ms.

Figure 4:
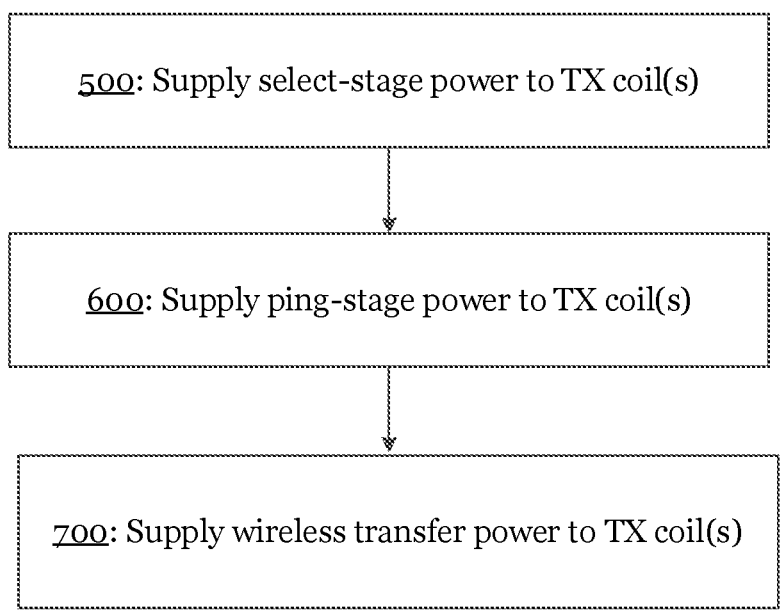
FIG. 4 is a flow diagram illustrating an example method for wireless power transfer, consistent with exemplary embodiments of the present disclosure.

FIG. 4 shows an example method 400 for wireless power transfer, consistent with exemplary embodiments of the present disclosure. The method 400 may be performed by one or more components (e.g., the TX controller unit 116) of the power transmitter system 110 (e.g., a wireless power transmitter) described above. The method 400 may comprise steps 500, 600, and 700, one or more of which may be optional. Although method 400 will be described with reference to two groups of transmitter coils, it can be similarly applied to more groups of transmitter coils. Further, a wireless power transmitter may comprise many transmitter coils in addition to the grouped transmitter coils for the method implementation.

Step 500 may be referred to as a selection stage of a wireless power transfer. At step 500, select-stage power may be supplied to one or more TX coils to obtain selected TX coil(s). This step can determine the presence of receiver coils of wireless power receiver(s) in the proximity of TX coil(s) by alternately powering up one or more TX coils for a short time. Thus, less power is consumed to detect wireless power receivers. More details of this step are described below with reference to FIG. 5.

Step 600 may be referred to as a ping stage of a wireless power transfer. At step 600, ping-stage power may be supplied to one or more selected TX coil(s). The ping-stage power may comprise multiple incremental powering stages supplied until receiving a response from the power receiver. Thus, a connection with the wireless power receiver can be established at a lower energy cost. This step can confirm that the receiver(s) are ready to engage in wireless power transfer. More details of this step are described below with reference to FIG. 6.

Step 700 may be referred to as a power transfer stage. At step 700, wireless transfer power may be supplied to one or more TX coils. Through the wireless power transfer, RX coils of the wireless power receiver(s) may receive power from the TX coils.

Figure 5:
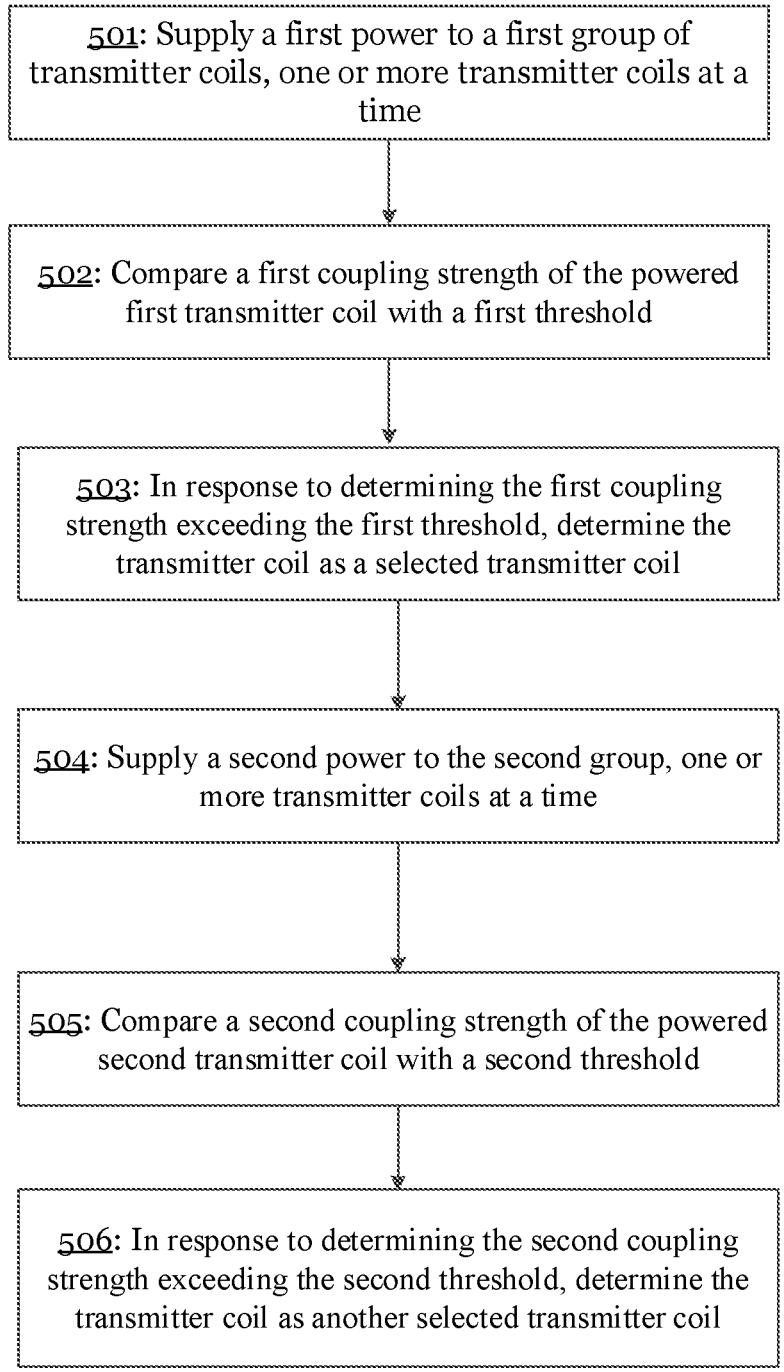
FIG. 5 is a flow diagram illustrating another example method for wireless power transfer, consistent with exemplary embodiments of the present disclosure.

FIG. 5 shows an example method 500 for wireless power transfer, consistent with exemplary embodiments of the present disclosure. The method 500 may be performed by one or more components (e.g., the TX controller unit 116) of the power transmitter system 110 (e.g., a wireless power transmitter) described above. One or more steps of the method 500 may be rearranged in another order. One or more steps of the method 500 may be optional. Method 500 may be referred to as a selection stage of wireless power transfer.

The power transmitter system may comprise a plurality of groups of TX coils, with each group comprising one or more TX coils. For example, the power transmitter system may comprise a wireless charging surface, and a first group (Group 1) and a second group (Group 2) of transmitter coils as described above with reference to FIG. 3. The power transmitter system may comprise more groups of transmitter coils, and more or fewer transmitter coils than those shown in FIG. 3. The first group of transmitter coils may be disposed in a first plane, and the second group of transmitter coils may be disposed in a second plane. The first and second planes may be substantially parallel to the wireless charging surface, and the first plane may be closer to the wireless charging surface than the second plane.

At step 501, a first power may be supplied to a first group of transmitter coils, one or more transmitter coils at a time. For example, one TX coil, two TX coils (e.g., two adjacent TX coils), or even more TX coils of the first group may be powered up at the same time for a predetermined time period (e.g., 5 ms).

At step 502, a first coupling strength of the powered-up first transmitter coil may be compared with a first threshold. The coupling strength may be determined and compared as described above with reference to FIG. 3.

At step 503, in response to determining the first coupling strength exceeding the first threshold, the corresponding transmitter coil may be determined as a selected transmitter coil.

At step 504, a second power may be supplied to the second group, one or more transmitter coils at a time. For example, one TX coil, two TX coils (e.g., two adjacent TX coils), or even more TX coils of the second group may be powered up at the same time for a predetermined time period (e.g., 5 ms). As discussed above with reference to FIG. 3, The first power may be smaller than the second power.

At step 505, a second coupling strength of the powered-up second transmitter coil may be compared with a second threshold. The second threshold may be the same as or different from the first threshold.

At step 506, in response to determining the second coupling strength exceeding the second threshold, the transmitter coil may be determined as another selected transmitter coil.

In some embodiments, the first power and the second power may be alternately supplied, until a predetermined time period has reached, or the number of the selected transmitter coils reaches a predetermined one as described above with reference to FIG. 3, or an input power (e.g., $P_{IN}$ 111) to the TX system is turned off, etc.

FIG. 6 shows an example method 600 for wireless power transfer, consistent with exemplary embodiments of the present disclosure. The method 600 may be performed by one or more components (e.g., the TX controller unit 116) of the power transmitter system 110 (e.g., a wireless power transmitter) described above. One or more steps of the method 600 may be rearranged in another order. One or more steps of the method 600 may be optional. In some embodiments, method 600 may be implemented after method 500. Method 600 may be referred to as a ping stage of wireless power transfer.

At step 601: the supply of the first power and the second power of method 500 may be ceased. The selection stage power supply of method 500 may be ended before method 600, or otherwise ended at this step.

At step 602: a third power may be supplied to each of the selected transmitter coils from the first group, and a fourth power may be supplied to each of the selected transmitter coils from the second group. The first group and second group of transmitter coils may be those described in method 500. As discussed above, the first group may be closer to the wireless charging surface than the second group, and requires less power supply to achieve similar electromagnetic coupling effects. Thus, the third power may be lower than the fourth power. Step 602 may comprise sub-steps 603-607, some of which may be optional or rearranged in another order.

At step 603, a third power for supplying to each of the selected transmitter coils from the first group and a fourth power for supplying to each of the selected transmitter coils from the first group may be determined.

At step 604, a number of stages of ping stage power supply may be determined. The number of stages may be one, two, three, etc. The first and second groups may have the same or different number of stages.

At step 605, based on the determined number of stages, a plurality of stages of the third and fourth power for supplying to each of the selected transmitter coils from the first and second groups may be respectively determined, the plurality of stages of the third power incrementing from a first stage up to a final stage equal to the third power, and the plurality of stages of the fourth power incrementing from a first stage up to a final stage equal to the fourth power.

At step 606, for a predetermined time (e.g., a few ms), the first stage of the third power may be supplied to each of the selected transmitter coils from the first group, and the first stage of the fourth power may be supplied to each of the selected transmitter coils from the second group.

At step 607, in response to not receiving a predetermined response (e.g., a predetermined electromagnetic signal) from a wireless power receiver, a next stage of the third power and a next stage of the fourth power may be supplied. For example, if the third power is 2 mW, the fourth power is 2.4 mW, and the number of stages is 4, the selected group 1 coils will be powered up at 0.5 mW, 1 mW, 1.5 mW, and 2 mW, and selected group 2 coils will be powered up at 0.6 mW, 1.2 mW, 1.8 mW, and 2.4 mW each for 5 ms. That is, at stage 1 lasting for 5 ms, the selected group 1 coil(s) will be powered up at 0.5 mW, and the selected group 2 coil(s) will be powered up at 0.6 mW; at stage 2 lasting for 5 ms, the selected group 1 coil(s) will be powered up at 1 mW, and the selected group 2 coil(s) will be powered up at 1.2 mW; and so forth. The ping-stage power supply will increment according to the determined power stages, unless one or more predetermined responses are received from the wireless power receiver as described in step 607. The various power supply stages may be effectuated by tuning a frequency of the power supply. The supplied various stages of third and fourth powers to the corresponding transmitter coils may be configured to wirelessly power one or more micro controller units of the wireless power receiver. When powered up at any stage of the third or fourth power, the one or more micro controller units of the wireless power receiver may transmit the predetermined response(s) to the power transmitter (e.g., via the direct or indirect communication described above).

In some embodiments, in response to receiving the predetermined response from the wireless power receiver, the corresponding stage of the third or fourth power may be increased to a wirelessly transfer power level. Continuing the example in step 607, if the predetermined response is received at the second stage of the third power of 1 mW, the ping stage may transit into the power transfer stage by increasing the second stage power to the predetermined wireless transfer power level (e.g., from 1 mW to 2 W by tuning the frequency of the power supply to the selected TX coils). The fourth power may continue the ping-stage power increment until obtaining a corresponding predetermined response.

In any stage of the wireless power transfer, the wireless power transfer system may monitor one or more parameters (e.g., a current in the TX coil circuit 115 or a current of the power adaptor 112) to determine the presence of a dangerous foreign object (e.g., a metal key) that may trigger power overload and harm the wireless power transfer system. In some embodiments, the controller unit 116 may be configured to compare the one or more parameters with corresponding one or more thresholds, and in response to determining the one or more parameters exceeding the corresponding one or more thresholds, cease any power supply to the corresponding one or more transmitter coils. In the meanwhile, other TX coils that not determined as coupling to a dangerous foreign object may continue the wireless power transfer steps.

The specification has described methods, apparatus, and systems for wireless power transfer. The disclosed system may maximize the area usage to reduce the cost of TX coils and may be easily expanded to a larger charging area based on requirements. With the switch circuits and communication circuits configured to detect RX devices' locations, the system may provide flexibility and deliver optimal performance and user experience in wireless power transfer applications. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A wireless power transfer system, comprising:
a first group and a second group of transmitter coils, wherein:
each group comprises one or more transmitter coils,
the first group of transmitter coils are disposed in a first plane, and
the second group of transmitter coils are disposed in a second plane; and
a controller unit configured to:
supply a first power to the first group, one or more transmitter coils at a time;
compare a first coupling strength of the powered first transmitter coil with a first threshold;
in response to determining the first coupling strength exceeding the first threshold, determine the transmitter coil as a selected transmitter coil;
supply a second power to the second group, one or more transmitter coils at a time;
compare a second coupling strength of the powered second transmitter coil with a second threshold;
in response to determining the second coupling strength exceeding the second threshold, determine the transmitter coil as another selected transmitter coil;
cease the supply of the first power and the second power; and
supply a third power to each of the selected transmitter coils from the first group and a fourth power to each of the selected transmitter coils from the second group, wherein the third power is lower than the fourth power.

2. The wireless power transfer system of claim 1, further comprising:
a wireless charging surface configured to provide wireless power transfer to one or more wireless power receivers disposed on one side of the surface, wherein:
the first and second groups of transmitter coils are disposed on the other side of the surface, and
the first group of transmitter coils are closer to the wireless charging surface than the second group of transmitter coils.

3. The wireless power transfer system of claim 2, wherein:
at least one of the first group of transmitter coils overlaps with at least one of the second group of transmitter coils in a direction perpendicular to the wireless charging surface.

4. The wireless power transfer system of claim 2, wherein:
the first plane is substantially parallel to the wireless charging surface;
the second plane is substantially parallel to the wireless charging surface; and
the first plane is closer to the wireless charging surface than the second plane.

5. The wireless power transfer system of claim 1, wherein:
all of the transmitter coils are identical; and
the first power is smaller than the second power.

6. The wireless power transfer system of claim 1, wherein:
the controller unit configured to:
supply the first power to one transmitter coil or two adjacent transmitter coils at a time; and
supply the second power to one transmitter coil or two adjacent transmitter coils at a time.

7. The wireless power transfer system of claim 1, wherein:
the controller unit is configured to:
supply the first or second power respectively to the corresponding transmitter coil for a predetermined time;
alternately supply the first and the second power; and
cease the supply of the first and second power in response to the selected transmitter coils reaching a predetermined number.

8. A wireless power transfer system, comprising:
a first group and a second group of transmitter coils, wherein:
each group comprises one or more transmitter coils,
the first group of transmitter coils are disposed in a first plane, and
the second group of transmitter coils are disposed in a second plane; and
a controller unit configured to:
supply a first power to the first group, one or more transmitter coils at a time;
compare a first coupling strength of the powered first transmitter coil with a first threshold;
in response to determining the first coupling strength exceeding the first threshold, determine the transmitter coil as a selected transmitter coil;
supply a second power to the second group, one or more transmitter coils at a time;
compare a second coupling strength of the powered second transmitter coil with a second threshold;
in response to determining the second coupling strength exceeding the second threshold, determine the transmitter coil as another selected transmitter coil;
determine a third power for supplying to each of the selected transmitter coils from the first group and a fourth power for supplying to each of the selected transmitter coils from the first group;
determine a number of stages;
based on the determined number of stages, respectively determine a plurality of stages of the third and fourth power for supplying to each of the selected transmitter coils from the first and second groups, the plurality of stages of the third power incrementing from a first stage up to a final stage equal to the third power, and the plurality of stages of the fourth power incrementing from a first stage up to a final stage equal to the fourth power;
for a predetermined time, supply the first stage of the third power to each of the selected transmitter coils from the first group and the first stage of the fourth power to each of the selected transmitter coils from the second group; and
in response to not receiving a predetermined response from a wireless power receiver, supply a next stage of the third power and a next stage of the fourth power.

9. The wireless power transfer system of claim 8, wherein the number of stages is two or three.

10. The wireless power transfer system of claim 8, wherein:

the supplied third and fourth powers are configured to wirelessly transfer power to one or more controller units of the wireless power receiver via the corresponding transmitter coils; and the predetermined response is receivable from the one or more controller units of the wireless power receiver, in response to the one or more controller units being powered by any stage of the third or fourth power.

11. The wireless power transfer system of claim 8, wherein:
the controller unit is further configured to, in response to receiving the predetermined response from the wireless power receiver, increase the corresponding stage of the third or fourth power to a wirelessly transfer power level for the wireless power receiver.

12. The wireless power transfer system of claim 11, wherein:
the controller unit is further configured to:
compare one or more parameters with corresponding one or more thresholds, wherein the one or more parameters comprising at least one of a current in the transmitter coils or a current of a power adaptor coupled to the transmitter coils; and
in response to determining the one or more parameters exceeding the corresponding one or more thresholds, cease any power supply to the corresponding one or more transmitter coils.

13. A wireless power transfer method, implemented by a wireless power transfer system, comprising:
supplying a first power to a first group of transmitter coils, one or more transmitter coils at a time;
comparing a first coupling strength of the powered first transmitter coil with a first threshold;
in response to determining the first coupling strength exceeding the first threshold, determining the transmitter coil as a selected transmitter coil;
supplying a second power to a second group of transmitter coils, one or more transmitter coils at a time;
comparing a second coupling strength of the powered second transmitter coil with a second threshold;
in response to determining the second coupling strength exceeding the second threshold, determining the transmitter coil as another selected transmitter coil, wherein:
each group comprises one or more transmitter coils,
the first group of transmitter coils are disposed in a first plane, and
the second group of transmitter coils are disposed in a second plane;
ceasing the supply of the first power and the second power; and
supplying a third power to each of the selected transmitter coils from the first group and a fourth power to each of the selected transmitter coils from the second group, wherein the third power is lower than the fourth power.

14. The wireless power transfer method of claim 13, wherein:
the first group of transmitter coils are closer to a wireless charging surface of the wireless power transfer system than the second group of transmitter coils;
the wireless charging surface is configured to provide wireless power transfer to one or more wireless power receivers disposed on one side of the surface; and
the first and second groups of transmitter coils are disposed on the other side of the surface.

15. The wireless power transfer method of claim 14, wherein:

at least one of the first group of transmitter coils overlaps with at least one of the second group of transmitter coils in a direction perpendicular to the wireless charging surface.

16. The wireless power transfer method of claim 14, wherein:
the first plane is substantially parallel to the wireless charging surface;
the second plane is substantially parallel to the wireless charging surface; and
the first plane is closer to the wireless charging surface than the second plane.

17. The wireless power transfer method of claim 13, wherein:
all of the transmitter coils are identical; and
the first power is smaller than the second power.

18. The wireless power transfer method of claim 13, wherein:
supplying the first power to the first group of transmitter coils comprises supplying the first power to one transmitter coil or two adjacent transmitter coils at a time; and
supplying the second power to the second group of transmitter coils comprises supplying the first power to one transmitter coil or two adjacent transmitter coils at a time.

19. The wireless power transfer method of claim 13, wherein:
supplying the first or second power respectively to the corresponding transmitter coil for a predetermined time;
alternately supplying the first and the second power; and
ceasing the supply of the first and second power in response to the selected transmitter coils reaching a predetermined threshold number.

20. The wireless power transfer method of claim 13, further comprising:
determining the third power for supplying to each of the selected transmitter coils from the first group and the fourth power for supplying to each of the selected transmitter coils from the first group;
determining a number of stages;
based on the determined number of stages, respectively determining a plurality of stages of the third and fourth power for supplying to each of the selected transmitter coils from the first and second groups, the plurality of stages of the third power incrementing from a first stage up to a final stage equal to the third power, and the plurality of stages of the fourth power incrementing from a first stage up to a final stage equal to the fourth power;
for a predetermined time, supplying the first stage of the third power to each of the selected transmitter coils from the first group and the first stage of the fourth power to each of the selected transmitter coils from the second group; and
in response to not receiving a predetermined response from a wireless power receiver, supplying a next stage of the third power and a next stage of the fourth power.

21. The wireless power transfer method of claim 20, wherein the number of stages is two or three.

22. The wireless power transfer method of claim 20, wherein:

the supplied third and fourth powers are configured to wirelessly transfer power to one or more controller units of the wireless power receiver via the corresponding transmitter coils; and the predetermined response is receivable from the one or more controller units of the wireless power receiver, in response to the one or more controller units being powered by any stage of the third or fourth power.

23. The wireless power transfer method of claim 20, further comprising:

in response to receiving the response from the wireless power receiver, increasing the corresponding stage of the third or fourth power to a wirelessly transfer power level for the wireless power receiver.

24. The wireless power transfer method of claim 23, further comprising:

comparing one or more parameters with corresponding one or more thresholds, wherein the one or more parameters comprising at least one of a current in the transmitter coils or a current of a power adaptor coupled to the transmitter coils; and in response to determining the one or more parameters exceeding the corresponding one or more thresholds, ceasing any power supply to the corresponding one or more transmitter coils.

25. A wireless power transmitter, comprising:

a first group and a second group of transmitter coils, each group comprising one or more transmitter coils;

a wireless charging surface configured to provide wireless power transfer to one or more wireless power receivers disposed on one side of the surface, wherein the first and second groups of transmitter coils are disposed on the other side of the surface, and the first group of transmitter coils are closer to the wireless charging surface than the second group of transmitter coils; and a controller unit configured to:

supply a first power to the first group, one or more transmitter coils at a time;

compare a first coupling strength of the powered first transmitter coil with a first threshold;

in response to determining the first coupling strength exceeding the first threshold, determine the transmitter coil as a selected transmitter coil;

supply a second power to the second group, one or more transmitter coils at a time;

compare a second coupling strength of the powered second transmitter coil with a second threshold;

in response to determining the second coupling strength exceeding the second threshold, determine the transmitter coil as another selected transmitter coil;

cease the supply of the first power and the second power; and supply a third power to each of the selected transmitter coils from the first group and a fourth power to each of the selected transmitter coils from the second group, wherein the third power is lower than the fourth power.

* * * * *